C. H. LOEW AND J. R. GRUETTER.
BOTTLE WASHER.
APPLICATION FILED SEPT. 18, 1912.

1,313,706.

Patented Aug. 19, 1919.
12 SHEETS—SHEET 8.

WITNESSES:
INVENTORS:

C. H. LOEW AND J. R. GRUETTER.
BOTTLE WASHER.
APPLICATION FILED SEPT. 18, 1912.

1,313,706.  Patented Aug. 19, 1919.
12 SHEETS—SHEET 9.

WITNESSES: INVENTORS
Chas. H. Loew
John R. Gruetter
BY Hull Smith
ATTYS

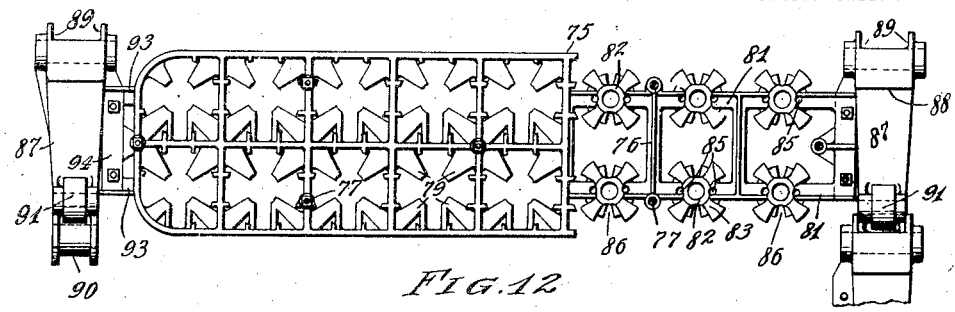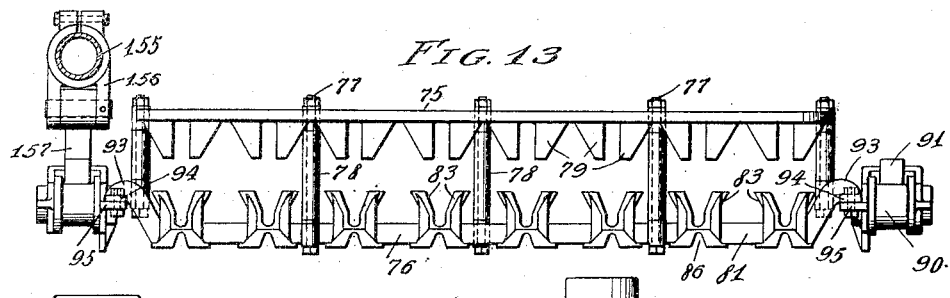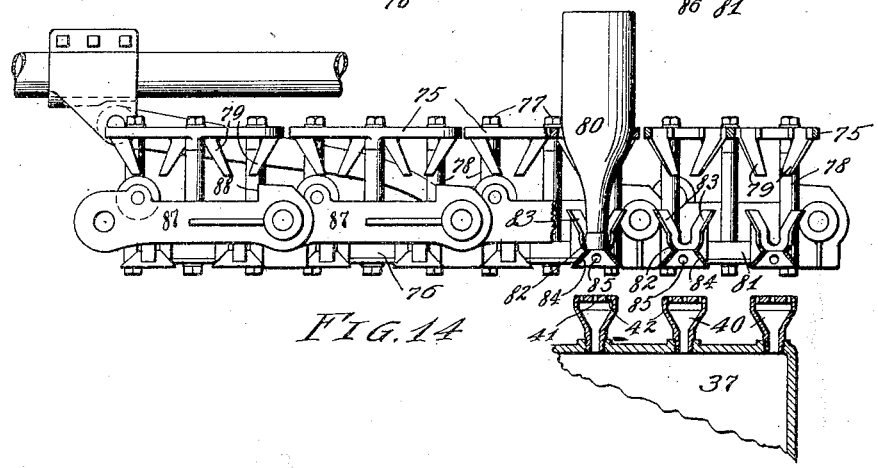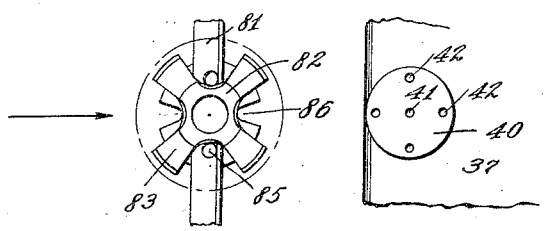

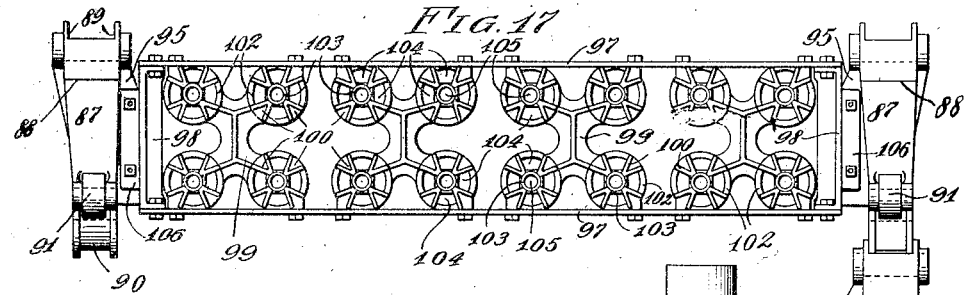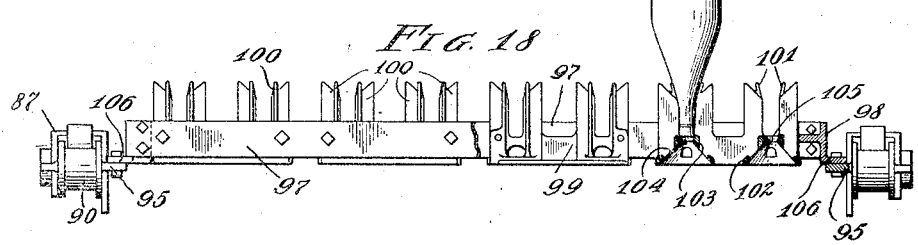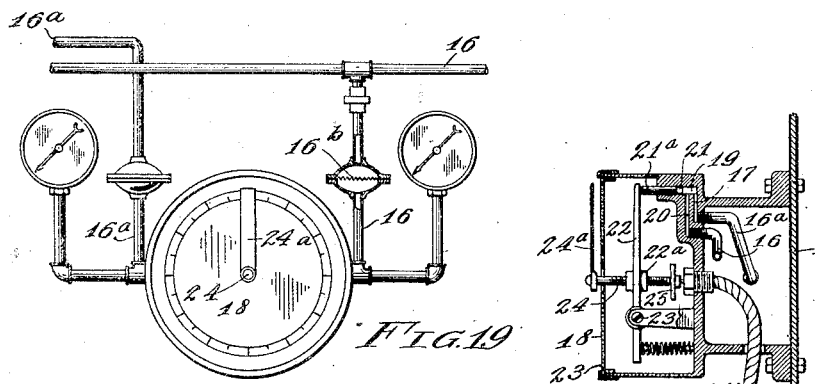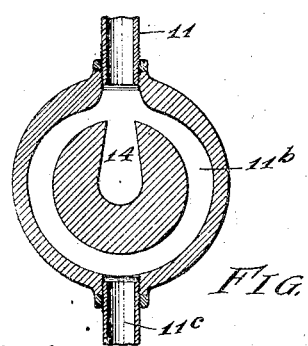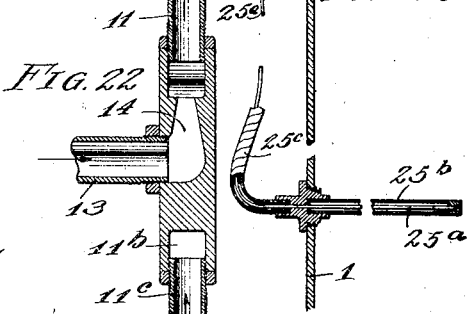

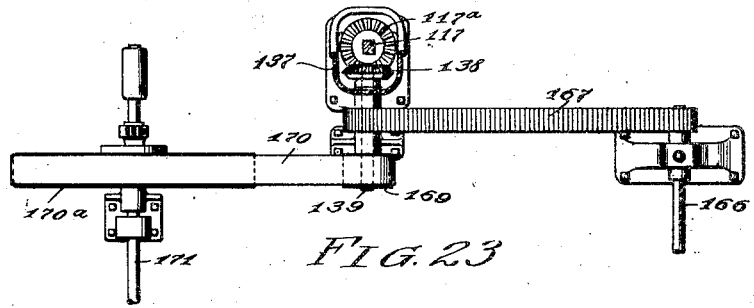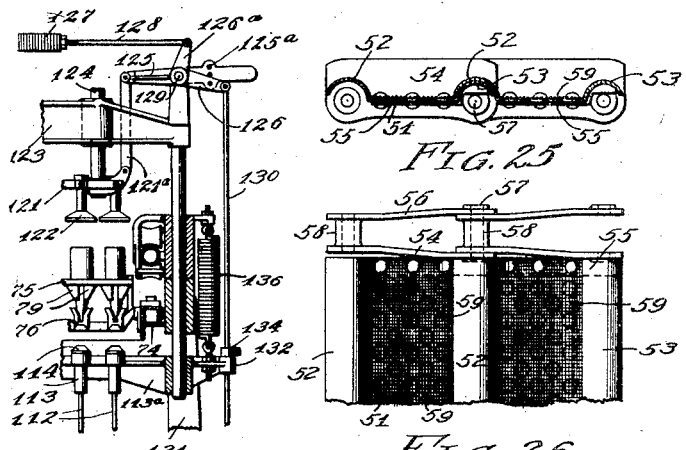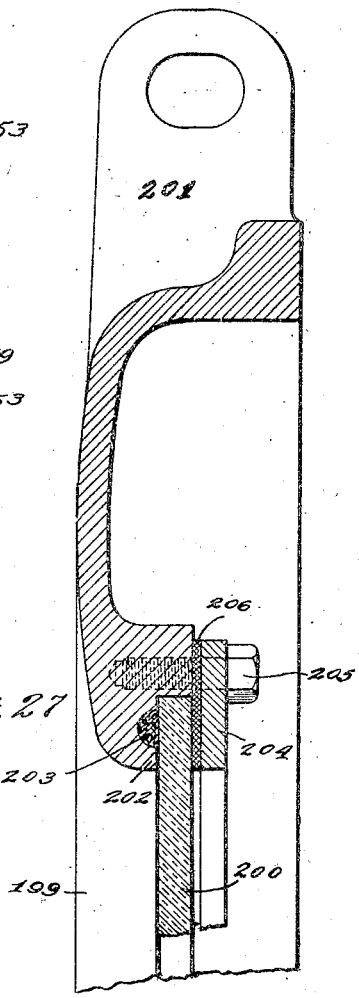

UNITED STATES PATENT OFFICE.

CHARLES H. LOEW AND JOHN R. GRUETTER, OF CLEVELAND, OHIO, ASSIGNORS TO THE LOEW MANUFACTURING COMPANY, OF CLEVELAND, OHIO, A CORPORATION OF OHIO.

BOTTLE-WASHER.

1,313,706.   Specification of Letters Patent.   Patented Aug. 19, 1919.

Application filed September 18, 1912. Serial No. 721,107.

*To all whom it may concern:*

Be it known that we, (1) CHARLES H. LOEW, (2) JOHN R. GRUETTER, citizens of the United States, residing at Cleveland, in the county of Cuyahoga and State of Ohio, have invented a certain new and useful Improvement in Bottle-Washers, of which the following is a full, clear, and exact description, reference being had to the accompanying drawings.

Figure 1:
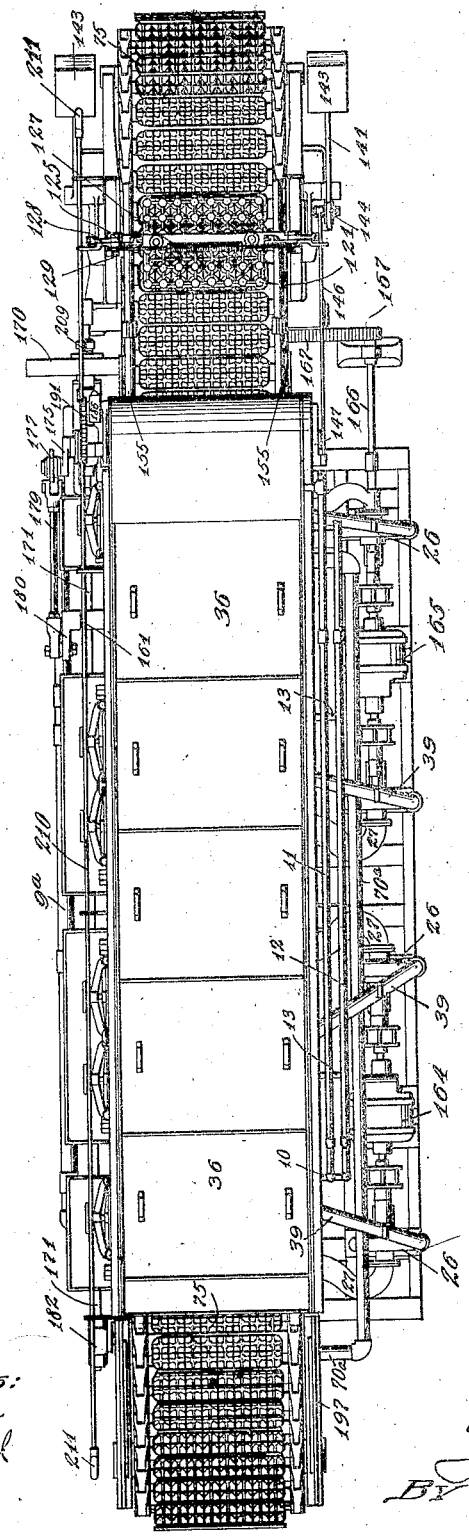
Figure 2:
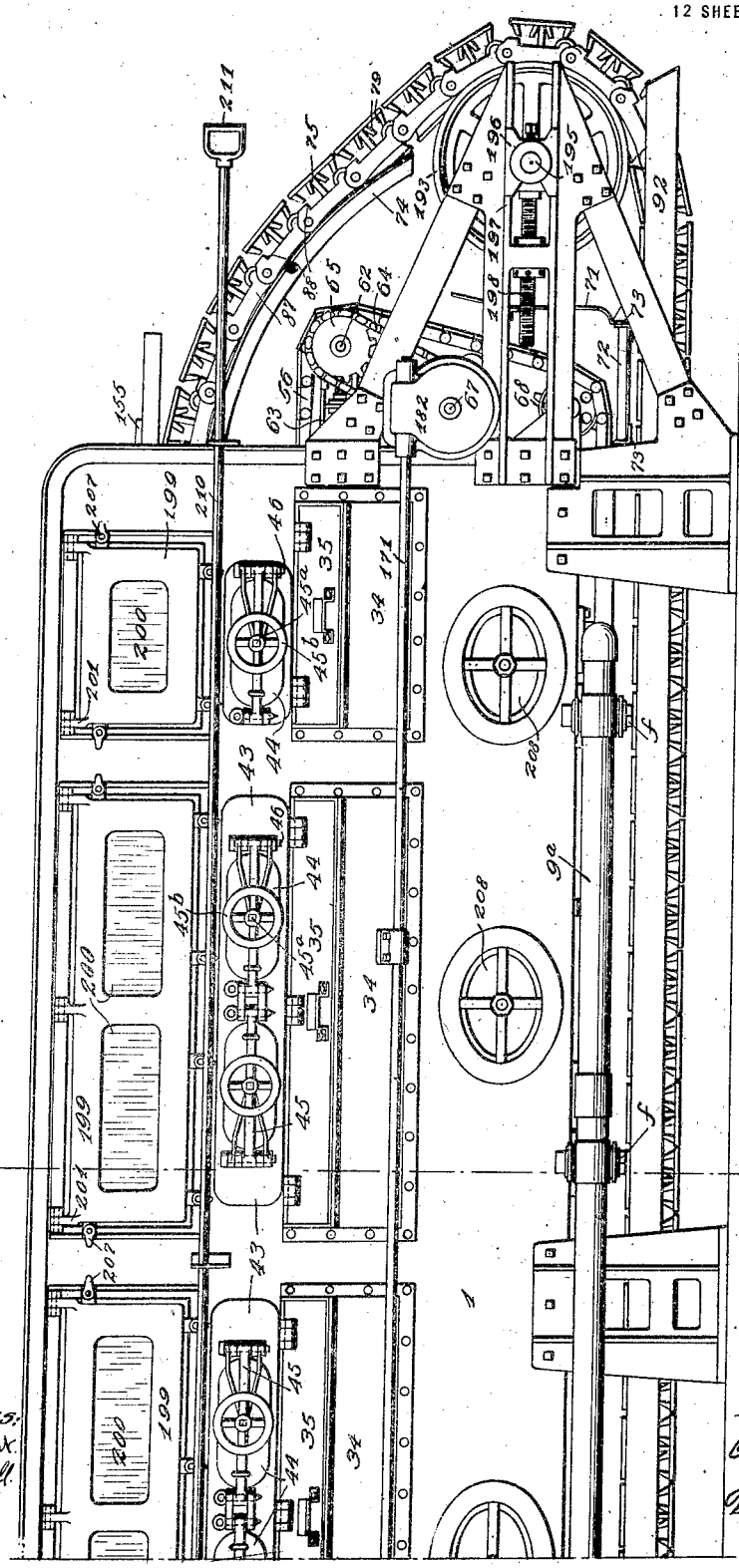
Figure 3:
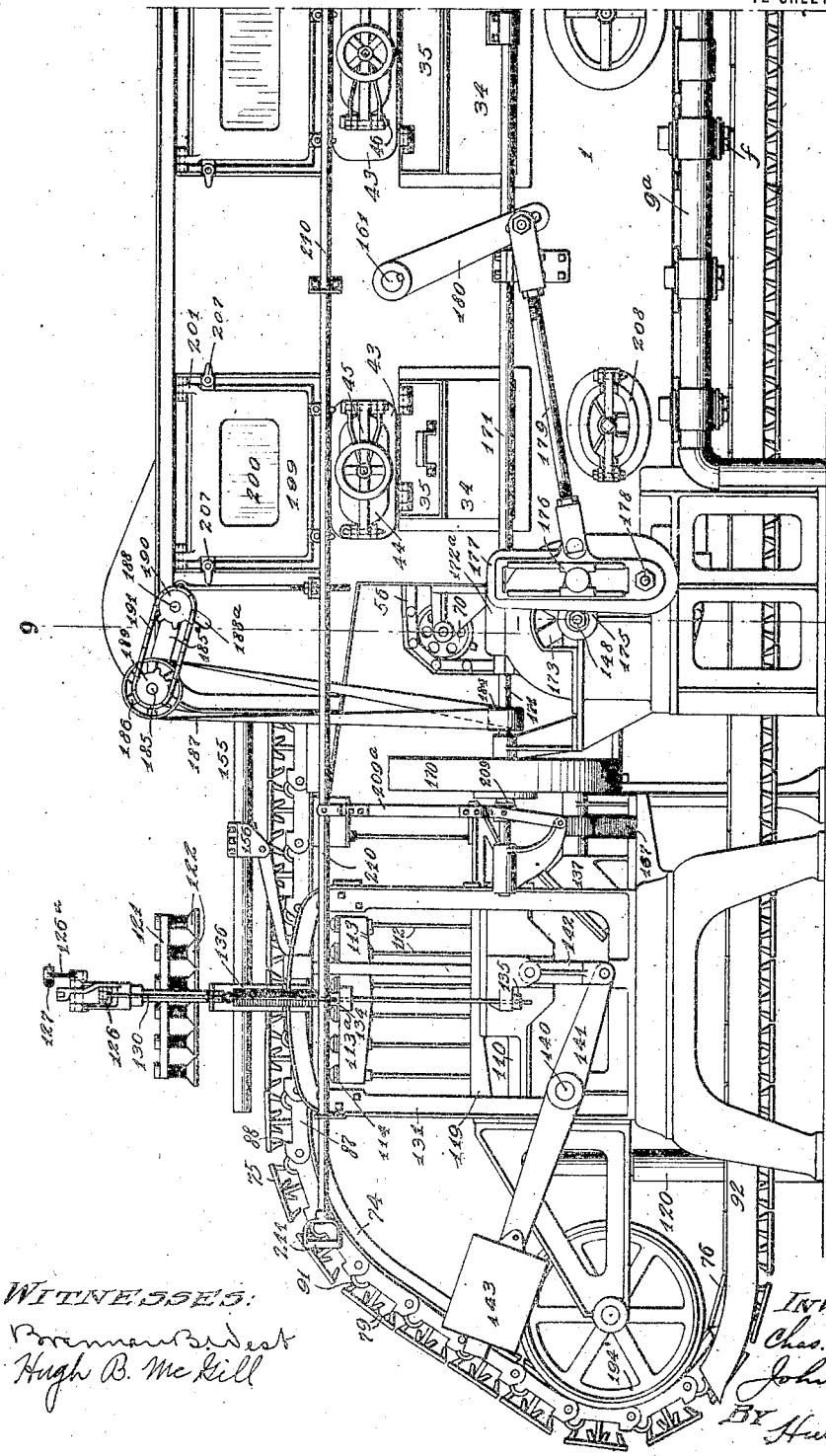
Figure 4:
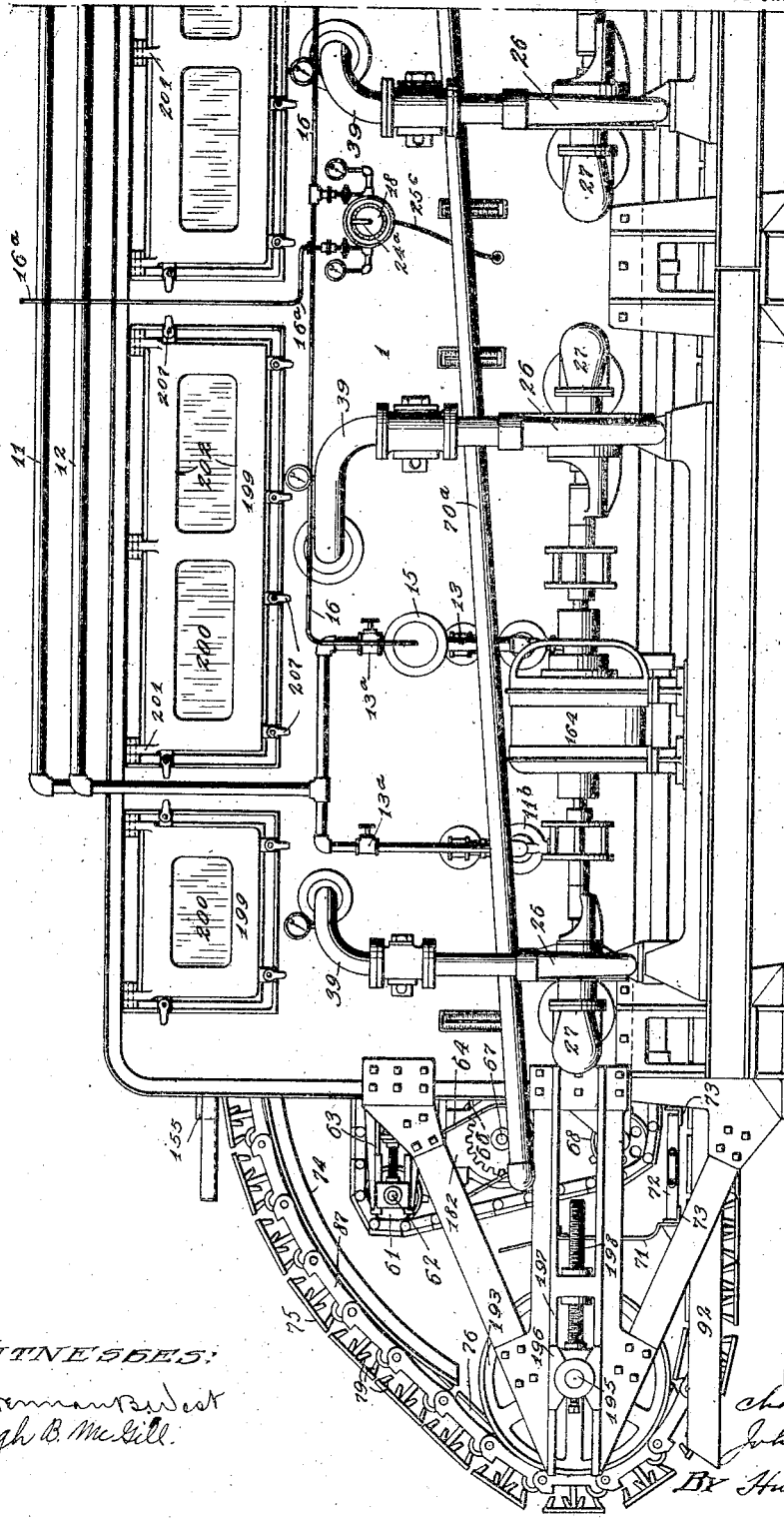
Figure 5:
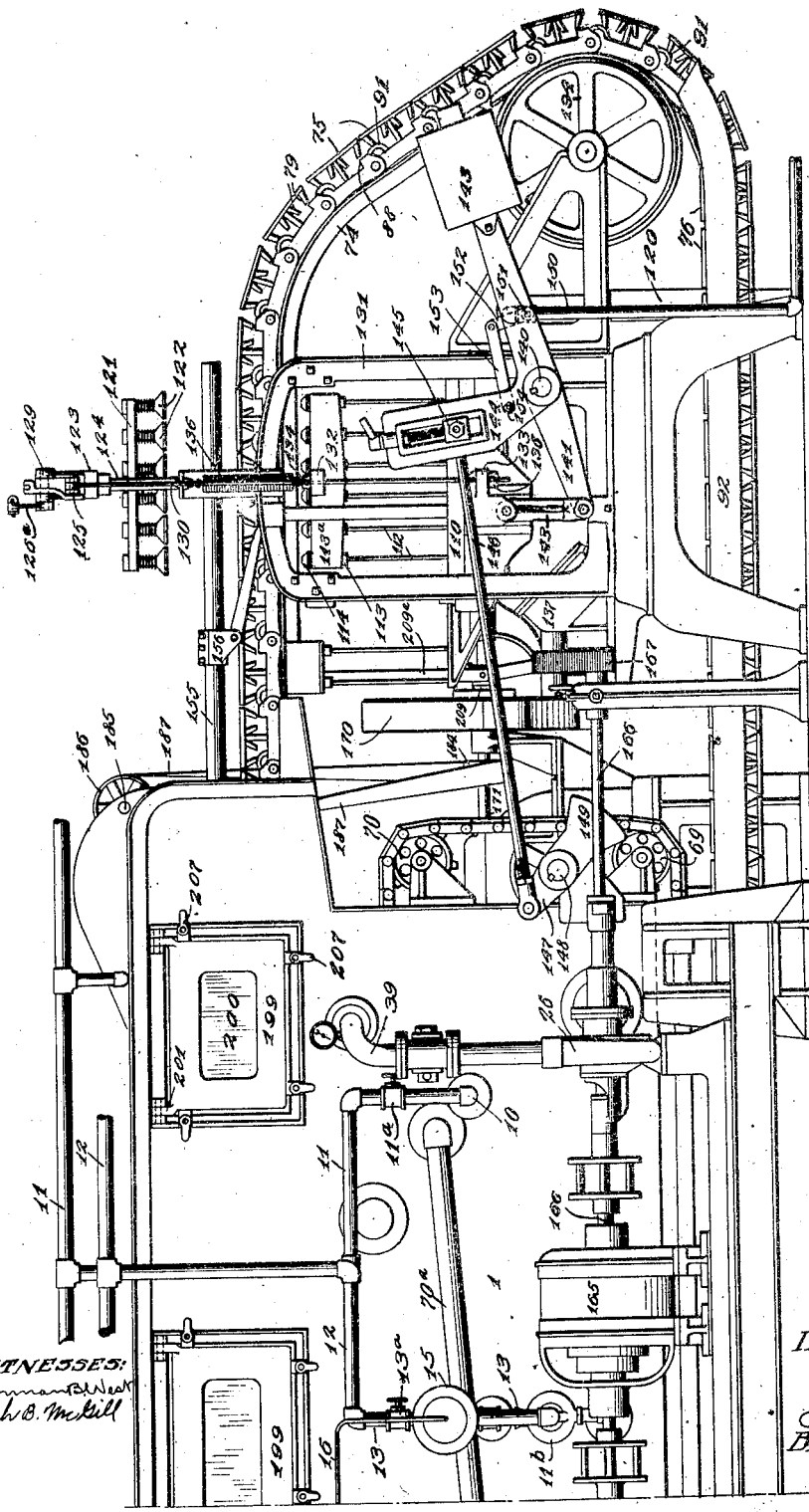
Figure 6:
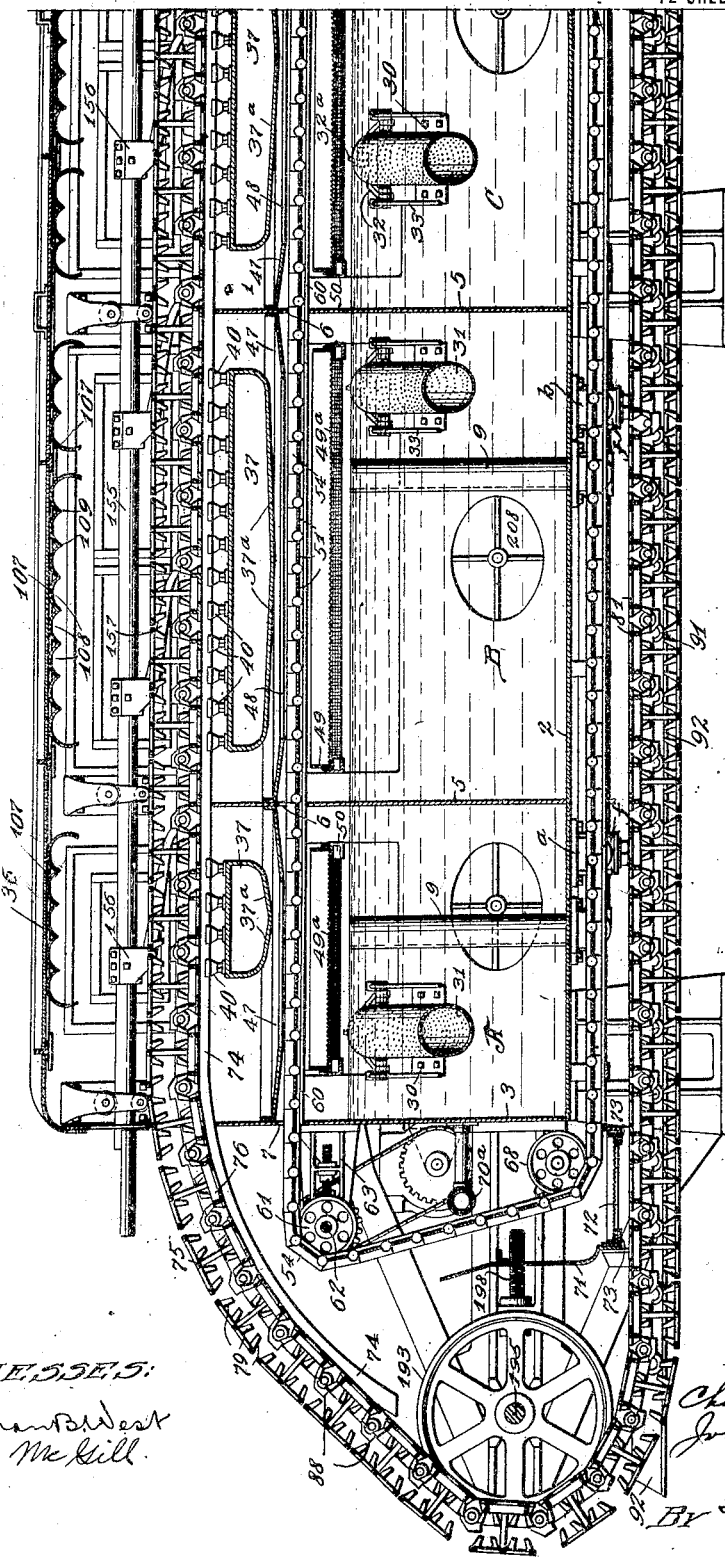
Figure 7:
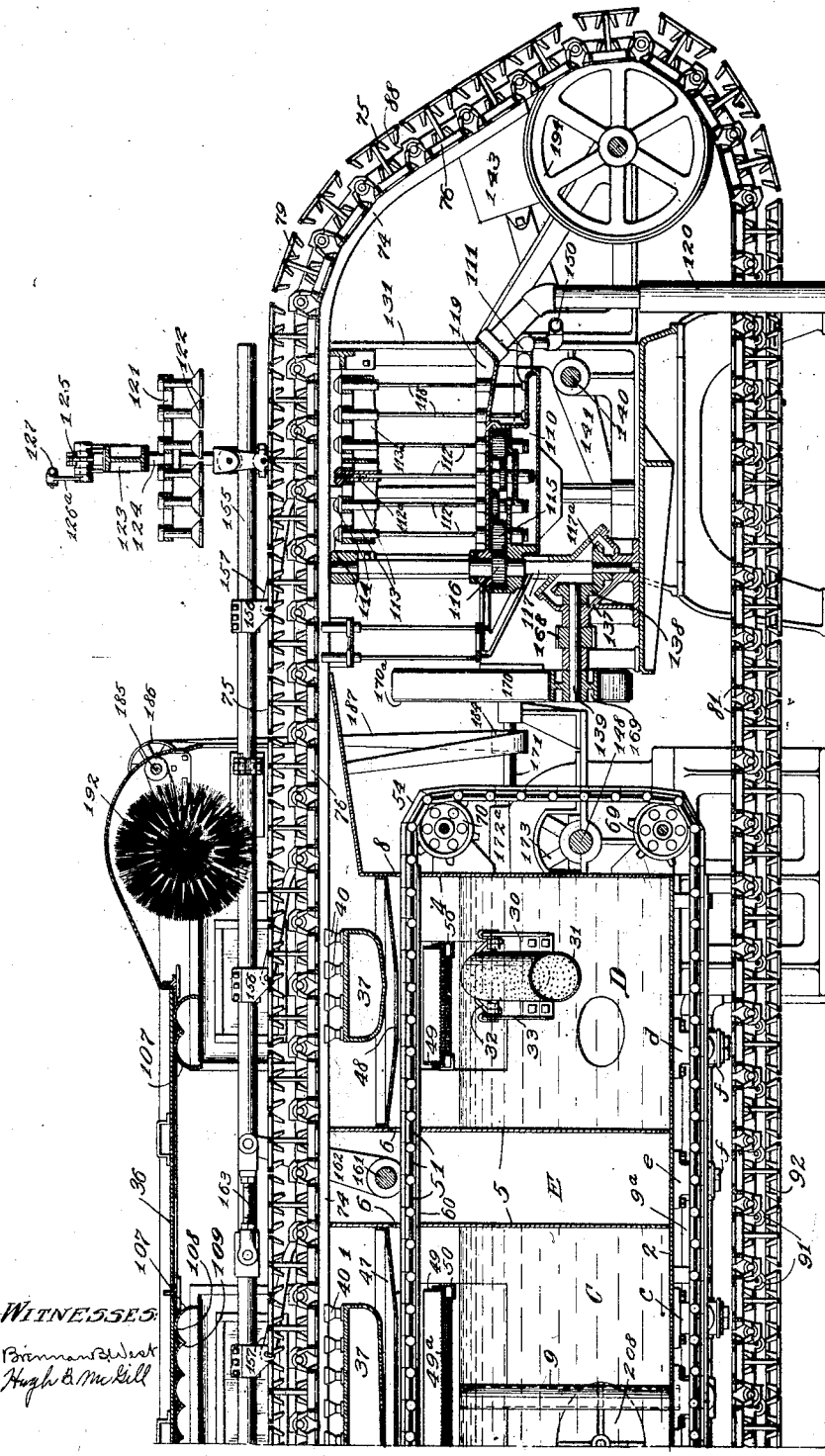
Figure 8:
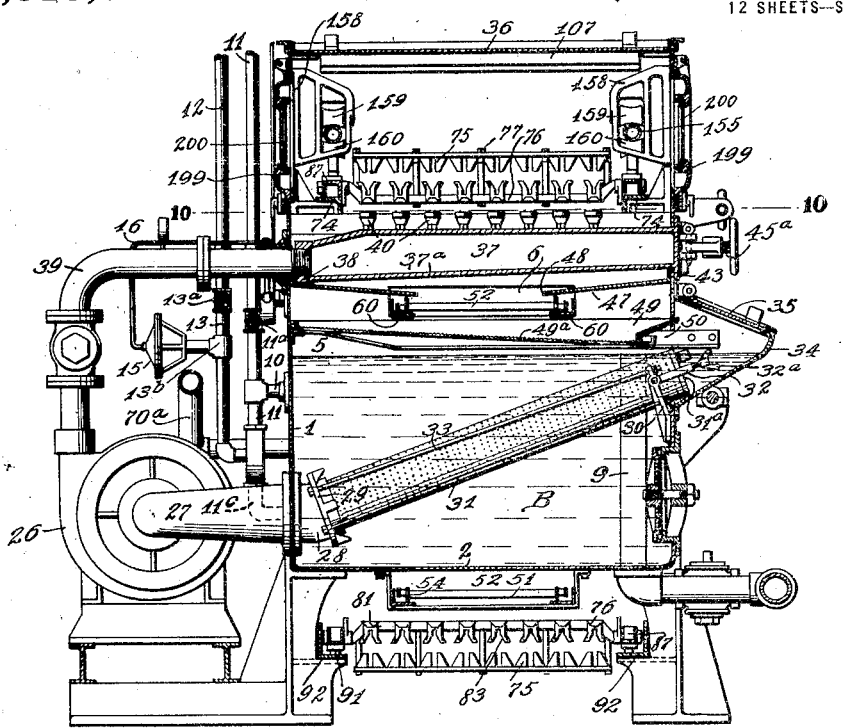
Figure 10:
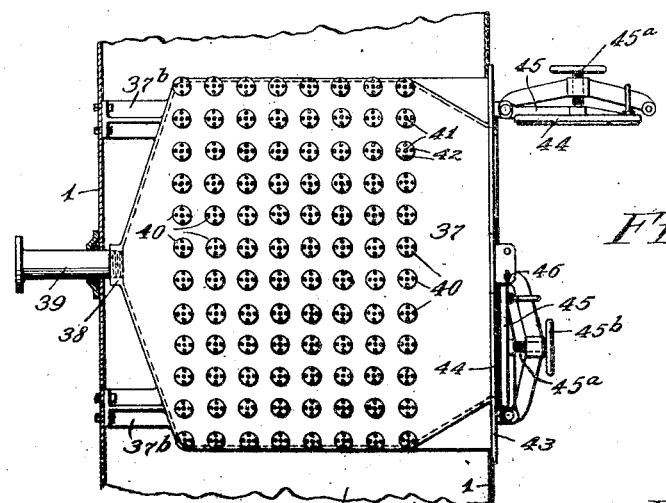
Figure 9:
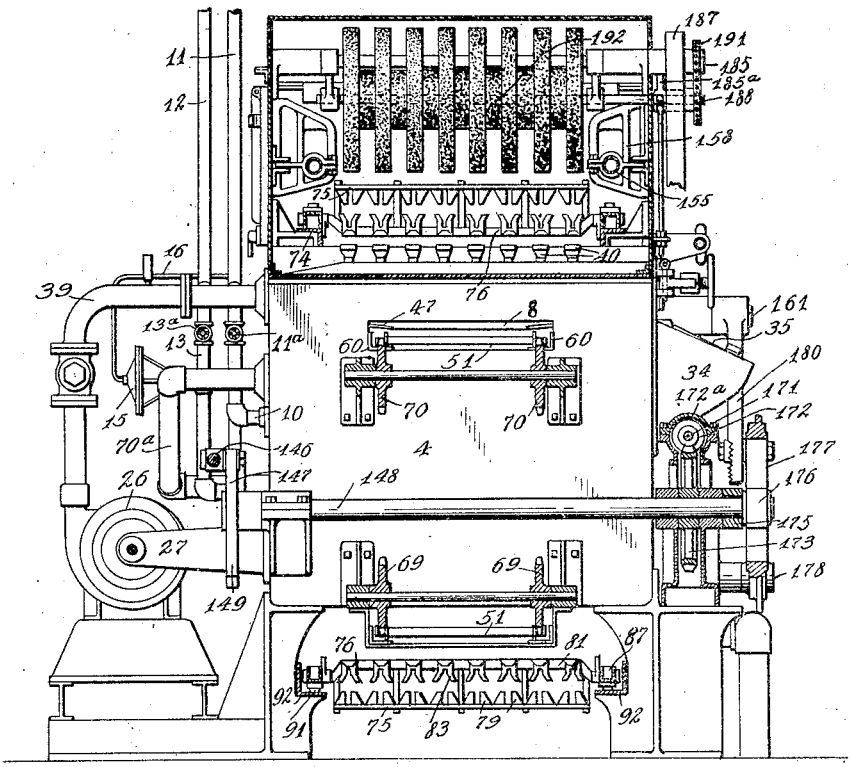
Figure 11:
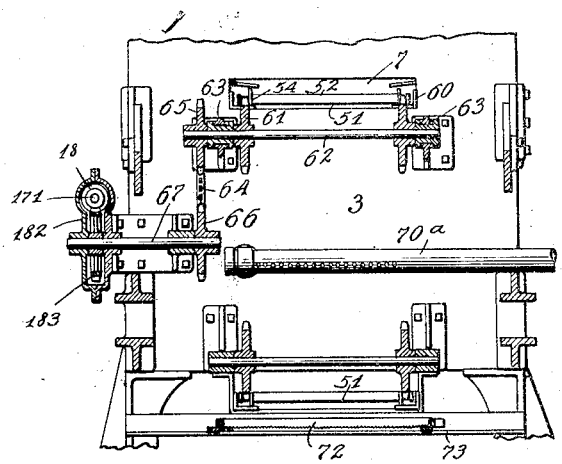

This invention relates to apparatus for cleaning bottles and similar articles, and has for its general objects to provide an apparatus of this character which will be largely automatic in its operation and which will soak, clean, and sterilize bottles in a very efficient manner. The apparatus described herein is similar in its general features to that disclosed in the application of John R. Gruetter, filed April 17, 1912, Ser. No. 691,478, but differs from the apparatus of the aforesaid application in several features, such as the construction of the bottle carrier, the construction of the bottle soaking means (including the means for supplying liquid to the insides and outsides of the bottles). Further objects of the invention are to provide means whereby the temperature of the cleansing and soaking liquid may be maintained substantially uniform throughout the operation of the apparatus, as well as to improve the general construction and operation of apparatus of this type. Generally stated, the invention may be defined as consisting of the combinations of elements set forth in the claims hereto annexed and illustrated in the drawings forming part hereof, wherein: Figure 1 represents a plan view of an apparatus constructed in accordance with the invention; Figs. 2 and 3 side elevations of the front and rear portions of the apparatus respectively; Figs. 4 and 5 side elevations of the parts of the apparatus shown respectively in Figs. 2 and 3, the views being taken from the opposite side; Figs. 6 and 7 are longitudinal sectional views of the front and rear portions of the apparatus, respectively; Figs. 8 and 9 transverse sectional views corresponding approximately to the lines 8—8 and 9—9 of Figs. 2 and 3 respectively. Fig. 10 is a sectional detail corresponding approximately to the line 10—10 of Fig. 8, illustrating the construction of the washing boxes; Fig. 11 is a front elevation of one side of the preliminary soaking and washing apparatus, certain parts being shown in section; Figs. 12 and 13 are details in plan and elevation respectively of one of the bottle carrier elements; Fig. 14 a detail, partly in elevation and partly in section of a portion of the bottle carrier and a coöperating portion of a spraying box; Fig. 15 is a plan view of one of the bottle mouth supports; Fig. 16 a plan view of one of the washing nozzles coöperating with such bottle support; Figs. 17 and 18 are views, similar to Figs. 12 and 13, respectively, of a modified construction of bottle carrier; Fig. 19 is a detail in side elevation of a part of the means whereby water and steam are supplied to the apparatus, certain parts being shown in section; Fig. 20 is a sectional detail through a side of the tank, illustrating the construction whereby the flow of the heating agent to the tank is automatically controlled; Figs. 21 and 22 are sectional details of the inlet connection whereby steam is admitted to the tank of the apparatus; Fig. 23 is a detail, partly in section, and partly in plan, of the driving mechanism; Fig. 24 is a sectional detail of a portion of the final brushing and rinsing device at the rear of the apparatus; Figs. 25 and 26 are details in section and plan, respectively, of the label conveyer; and Fig. 27 is an enlarged sectional detail of one of the removable windows or doors for the tank.

The apparatus disclosed herein comprises generally; a tank or receptacle having a plurality of liquid containing compartments therein; a pair of rails in said tank or receptacle extending longitudinally thereof and above the compartments; a rinsing or washing box in each compartment, each box being provided with a plurality of nozzles; connections for removing cleansing or sterilizing liquid from each compartment and forcing such liquid or solution into the coöperating nozzle box; an endless bottle carrier mounted on the rails; means for positively feeding or advancing said carrier along the rails with the mouths of the bottles supported thereby presented toward the nozzles so that the cleansing liquid flowing from the nozzles may be applied to the bottles as the latter are conveyed along the rails by a step-by-step movement; a label conveyer in the tank or receptacle arranged beneath the washing boxes and adapted to collect and remove any labels that may be soaked from the bottles; a combined pump inlet pipe and strainer within each compartment and adapted to supply liquid from such compartment to the pump and thence into the washing box above such compartment; a screening tray in each compartment arranged beneath the label conveyer and adapted to be removed through the side wall of the compartment; means for maintaining substantially constant the temperature of the liquid in any compartment; an overflow pipe for maintaining substantially constant the level of liquid in each compartment; means for supplying liquid to each compartment when necessary to replenish the same; a brush at the discharge end of the tank adapted to operate upon the bottoms of the bottles as they pass thereunder; a final internal brushing and rinsing mechanism at the discharge end of the tank and to which the bottles are fed (preferably by the same mechanism which feeds them through the tank); with means for automatically brushing and rinsing the interiors of the bottles as they pass through the final apparatus.

The tank or receptacle referred to hereinbefore is similar to that shown in the application of Gruetter referred to hereinbefore. This tank comprises side walls 1, a bottom wall 2, a front wall 3, a rear wall 4, and a plurality of transverse partitions 5 which divide the tank or receptacle into a plurality of liquid containing compartments A, B, C, and D. Each partition is provided with a slot 6 therein, above the level of the liquid which may be contained within the compartment, and similar slots 7 and 8 are provided in the front and rear walls of the tank or receptacle (see Figs. 6 and 7), said slots being in substantially the same horizontal plane and being provided for the passage of the endless label conveyer which will be described hereinafter. Each of the compartments A, B, and C is provided with an overflow pipe 9 projecting upwardly from the bottom of the tank. The tops of these pipes are in substantially the same horizontal plane, whereby the level of liquid in all of the compartments will be substantially the same. The compartments A, B, C, and D are provided each with a connection 10 whereby liquid may be supplied thereto from a pipe 11 (see Fig. 8). The compartments A, B, and C contain heated liquid and, for the purpose of heating the liquid therein, a steam pipe 12 is provided having a branch 13 extending to each of the compartments A, B, and C. The compartments having been filled to the proper level, the supply of water or other liquid thereto through the pipe 11 will be cut off by means of the valve 11ª. In compartments A, B, and C the water supply pipe is extended below the connection 10 and communicates with an annular chamber 11ᵇ, the lower portion of the chamber communicating with the compartment below the connection 10, as by means of the branch pipe 11ᶜ (see Figs. 8, 21 and 22), and a steam branch pipe 13 projects into an upwardly directed tapering passage or nozzle 14 within the casting containing the annular chamber 11ᵇ and discharges at its upper end into the annular chamber 11ᵇ, preferably in line with the pipe section 11 thereabove. With the valve 11ª closed and the valve 13ª open, it will be apparent that steam flowing through the nozzle 14 will create a circulation of the water from the bottom of the compartment (A, B, or C) through the annular chamber 11ᵇ and through the connection 10 into the upper part of the compartment. In this manner, the steam will effectively and uniformly raise the temperature of the liquid in each of the compartments.

The compartment D is intended to contain cold water for the final rinsing of the bottles passed through the tank; hence no steam supply is provided for this compartment, the water being admitted directly to the compartment through the connection 10. The steam supply branch 13 is provided with a suitable hand-operated valve 13ª by which the supply of steam to each compartment may be controlled. In addition, we prefer to control the supply of steam to each compartment by thermal conditions therewithin, and a construction by which this result may be realized is illustrated in Figs. 4, 5, 8, 19 and 20. In addition to the valve 13ª, each branch pipe 13 is provided with a valve, indicated generally at 13ᵇ, the stem whereof is connected with a diaphragm in the diaphragm chamber 15. The diaphragm in this chamber (not shown) is flexed by means of compressed air supplied to the chamber through a pipe 16, and the flow of air through the pipe 16 to the diaphragm chamber is controlled by temperature conditions within the compartment corresponding to such chamber. A construction for controlling the flow of the valve operating fluid (in this case compressed air) is shown more particularly in Figs. 19 and 20. In these views, 16ª denotes the pipe bringing air or other fluid under pressure from a source of supply. This pressure fluid is conducted through a valve, which is shown in Fig. 20 as comprising a vertical inlet passage 17 formed in the casting constituting the back of a gage 18, the vertical passage 17 communicating with a chamber 19 which is also in communication with a second vertical passage 20 communicating with the pipe 16. The gage referred to is conveniently supported by the side wall 1 of the receptacle. The flow of pressure fluid from the passage 17 into the passage 20 is controlled by a valve ball 21 which is mounted within the chamber 19 and is operated by a plug 21ᶜ, the outer end of which is engaged by a lever 22, said lever being pivotally supported on the interior of the gage chamber as shown at 23 and being provided with a boss 22ᵃ intermediate of its ends, through which a screw 24 is threaded. An adjusting handle 24ᵃ for varying the relation between the valve operating mechanism and the thermostatic element is secured to the outer end of the screw 24 and the opposite end of the screw bears against a member 25 which is connected to a rod 25ᵃ having its inner end connected to the corresponding end of a tube 25ᵇ projecting into the compartment from the side wall. The rod 25ᵃ is confined within a flexible metal tube 25ᶜ. From this construction, it will be evident that the lever 22 and the valve 21 will be operated by the expansion and contraction of the tube 25ᵇ to cause the opening and closing of the valve 21 according as the temperature falls below or exceeds the limits for which the thermostat is set. The pipes 16, 16ᵃ may be provided with a suitable strainer 16ᵇ (see Fig. 19).

Each compartment A, B, C, and D is connected with the suction side of a pump, one of the pumps being indicated at 26, the delivery side of the pump discharging into one of the washing boxes referred to hereinbefore. In order to prevent foreign matter entering and interfering with the operation of the pump, a strainer is employed on the intake side of each pump. In the construction shown herein, each pump is provided with an inlet pipe 27 connected to the side wall 1 of the tank and having an extension 28 projecting into the corresponding compartment of the tank and provided with an upwardly inclined end. This upwardly inclined end is provided with a flange 29. The opposite side wall of the tank is provided, above the pipe end 28, with a U-shaped plate 30, the upper end of the plate constituting a yoke for the reception of the upper end of the strainer, said strainer being preferably a pipe 31 having its upper end closed by a cover 31ᵃ and its lower end fitting over the upwardly directed end of the connection 28. The pipe 31 is provided with a large number of fine perforations and is detachably secured in place by means of the yoke 32 pivotally supported by the frame 30 and carrying a clamp screw 32ᵃ adapted to engage the upper end of the strainer and thereby force its lower end downwardly upon the pipe connection 28. Bolts 33 connecting the flange 29 and plate 30 constitute with these members a cradle or supporting frame for the strainer. When desired, the strainers may be conveniently removed through the upwardly inclined extensions 34 of the tank wall and the doors 35.

The label conveyer, washing boxes, bottle carriers, sediment trays, although associated with the tank, will be described hereinafter, it being sufficient to state that these parts are within the tank and beneath the cover 36, which cover is preferably composed of a number of removable plates or doors.

*Nozzle or washing boxes.*

Each compartment is provided with a nozzle box or washing box, all of the boxes being practically identical in construction. One of these boxes is shown in transverse section in Fig. 8 and comprises generally a casing 37 having at one end thereof a connection 38 for the reception of the pipe 39 which conducts liquid from the delivery side of the pump 26. It will be observed that the bottom of each box is upwardly inclined from the connection 38 to the opposite end of the box and that the bottom is inclined upwardly on opposite sides of the central portion thereof, as shown at 37ᵃ (see Figs. 6 and 8) to facilitate the draining and cleansing of said box toward the said connection. Each washing box is provided with a cover having a suitable number of nozzles 40. Each of these nozzles is provided with a top plate, preferably circular in outline and having a central aperture 41 and four apertures 42 near the outer periphery of the top plate and located about ninety degrees apart. The central aperture is intended to discharge water into the interior of a bottle thereabove while the lateral apertures 42 are intended to discharge water upwardly along the neck and outer side of the bottle to assist in removing the labels and dirt therefrom. Each washing box is conveniently applied to the tank by being inserted through an opening in the side wall opposite that through which the pipe connection 39 extends, the box being provided with a flange 43 adapted to engage the side wall of the tank and being provided with one or more doors 44 carried by a frame 45 which is pivoted at one end to lugs projecting from the flange 43 and has its outer end detachably connected to another pair of lugs projecting from said flange, as by means of a hinge pintle 46. Each door is adjustably mounted on its frame and may be forced to a seat in the cover flange 43 by means of a screw 45ᵃ extending through a yoke carried by the frame and bearing against the door, the screw being provided with an operating handle 45ᵇ. By opening these doors, the nozzle boxes may be conveniently cleaned whenever necessary or desirable. Cast with each box are lateral braces 37ᵇ having flanges adapted to abut against and be secured to the side of the tank, as by bolts.

Beneath each washing box there is located a tray, the outer edges of which are in engagement with the side walls of the tank. Each tray (indicated at 47) slopes downwardly from the outer edges thereof to a central opening 48, which is located directly above the label conveyer, (which will be described hereinafter). Below the tray and the label conveyer, and between the same and the top of the liquid in each compartment there is interposed a screen. This screen is generally rectangular in outline and comprises a peripheral supporting frame 49 for a wire gauze bottom 49ª, the bottom sloping downwardly from the side of the tank opposite the door 35 and the screen being slidably supported on suitable rails 50, extending transversely of the compartments and having ends projecting beyond the side wall and beneath the door 35.

Each liquid containing compartment of the tank is provided with a lateral drain pipe $a$, $b$, $c$ and $d$ respectively, each drain pipe communicating with the bottom of its compartment and having a valve $f$ therein. These lateral pipes communicate at their outer ends with the discharge pipe 9ª, with which the overflow pipes 9 are also in communication.

Label conveyer.

The label conveyer is of substantially the same construction as that disclosed in the application of John R. Gruetter hereinbefore referred to. This label conveyer, as is the case with that of the aforesaid application, comprises generally a plurality of perforated metallic plates 51 extending transversely of the tank or receptacle each plate having its opposite ends shaped to form a segment of a cylinder, as shown at 52 and 53 (see Figs. 25 and 26). The ends will be given a curvature substantially concentric with the pivotal connection between the adjacent plates, but the surface 53 will be of sufficiently less diameter than the surface 52 to receive thereover the semi-cylindrical end of the next adjacent plate. Each plate is connected at its lateral edge with what is in effect the side plate of a chain link, said side plate being shown at 54 and having an inwardly directed flange indicated at 55 in Fig. 25 and in dotted lines by the same numeral on Fig. 26. The vertical flange on each side plate 54 is preferably deflected outwardly at one side to receive between itself and the edge of the plate 51 the adjacent end of the next side plate. Coöperating with each side plate 54 is a side plate 56 and the ends of the side plates are connected by rivets 57 extending through the circular portions thereof, there being spacing sleeves 58 interposed between said plates. The plates 54—56 of the sleeves 58 form in effect chain links which are connected to and movable with the plates 51 of the conveyer, the whole construction providing a perforated metallic conveyer which can be driven in substantially the same manner as a leather or other endless belt. Instead of forming the screen by simply perforating the plates 51, as in the case of the earlier application, we make the perforations in the plates 51 of comparatively large size and cover the upper surface of each plate with a wire gauze 59 which serves to retain sediment, labels, etc., that may be discharged on top of the conveyer. The conveyer is supported at its side edges by the inwardly directed flanges 60 of a pair of angle iron rails, the rails being supported on the lower edges of the slats 6, 7 and 8 in the partitions.

The conveyer is driven by means of a pair of sprockets 61 mounted on a common drive shaft 62. The sprockets are adjustably mounted in slide ways 63 and their shaft 62 is driven by a chain 64, sprocket 65 on the shaft 62, and the sprocket 66 on the shaft 67. As is the case with the conveyer shown in the earlier application, the front part of the conveyer passes over guide wheels 68 located near the bottom of the tank and rearwardly of the sprocket 61, whereby the part of the conveyer passing between 61 and 68 is inclined downwardly and rearwardly to facilitate the dropping of labels, etc., therefrom. The conveyer passes beneath the bottom of the tank and around the guide wheels 69 and 70 at the rear end of the tank. As is the case with the construction shown in the earlier application of Gruetter, a pipe 70ª, extending from the rear compartment is arranged in proximity to the rear and inner surfaces of the conveyer and is adapted to discharge liquid through the perforations in the conveyer plates to dislodge labels or other sediment that may adhere to the conveying surfaces thereof. A shield 71 is provided between the pipe 70ª and the parts at the front of the apparatus, and a removable screen 72 is slidably supported at the bottom of this plate in laterally extending guide-ways 73, whereon labels, etc., dislodged from the conveyer may be collected and removed as occasion may require.

Bottle conveyer.

Coöperating with the washing boxes and with the final brushing and rinsing mechanism is an endless conveyer which serves to support the bottles and carry them through the apparatus from the front to the rear end thereof. This conveyer consists generally of a series of transverse bottle supporting frames connected at their ends by chain links. Each transverse frame, in one form of the invention, comprises an upper and a lower casting connected by bolts and spacing sleeves, the upper member having openings for the bodies of bottles and the lower member having seats for the mouths of the bottles. The transverse frames are connected to side plates whereby each assembly of upper and lower frames constitutes in effect an element of the conveyer. The chain links rest upon tracks extending longitudinally of the tank and support the conveyer in operative relation to the jet or spraying boxes. The construction of one of the conveyers is shown in Figs. 6 and 8 inclusive and Figs. 12 to 14 inclusive.

74 denotes the rails which serve to support the bottle conveyer. One element of the conveyer constructed as shown in the views referred to comprises an upper casting 75 and a lower casting 76 connected by bolts 77 with spacing sleeves 78 surrounding the bolts. By varying the lengths of these sleeves, the conveyer elements may be easily adapted for bottles of varying lengths. The casting 75 constitutes the upper frame member and is provided with a plurality of openings for bottles, said openings being conveniently formed by downwardly and inwardly projecting fingers 79 cast with and depending from the upper plates or member. The inner and lower ends of these fingers are spaced apart a sufficient distance to receive and support the tapered portion of a bottle 80 which joins the neck and body. The lower plate or frame member is provided with a plurality of bottle mouth seats, one for each set of fingers thereabove. These bottle mouth seats are conveniently carried by the opposite angle iron sides 81 of the lower frame member. Each support for a bottle mouth comprises an upwardly flaring seat 82 for the mouth of the bottle, there being upwardly diverging legs 83 extending from said seat and serving to guide the mouth of the bottle to the seat and to permit the upward flow of water around the seat. Below the seat 82, the bottle mouth support is flared downwardly and outwardly in frusto-conical shape, as shown at 84, and is provided with diametrically opposed holes 85 and with diametrically opposed slots 86, the slots being ninety degrees removed from the openings. The bottle mouth seats are preferably cast integral with the longitudinal sides 81 of the lower frame member. The purpose of this construction will be apparent by reference to Figs. 15 and 16, wherein the arrow indicates the direction of movement of one of the bottle mouth seats with reference to a coöperating nozzle 40. From this construction, it will be evident that, as the bottle mouth support moves over the nozzle, liquid from the nearest opening 42 which the support is approaching will first flow through the rear slot 86, which is nearest said opening and will strike the outer surface of the bottle. As the bottle mouth support comes into register with the nozzle, the liquid from this same opening 42 will enter the mouth of the bottle through the central aperture in the seat and will finally flow through the front slot 86. As will appear hereinafter, the bottle support will remain in this position for an interval of time during which liquid will flow from the peripheral openings 42 through the apertures 85 and slots 86 in contact with the exterior of the bottle, while the central opening 41 will be discharging into the interior of the bottle.

Each transverse frame (comprising the upper and lower frame members just described) is connected to the opposite links of two side chains. Each link comprises a body 87 having an upwardly projecting shoulder 88 at one end, forming a ratchet tooth. One end of each link is widened to receive the narrow end of the adjacent link and the other end of each link is narrowed to fit into the widened end of its adjacent link. The seat formed at the widened end of the link is indicated at 89 and the reduced end of the link at 90, the adjacent links being pivotally connected by pins, as is common in chain construction. Each link is provided with a roller 91, which serves to support the lower branch of the conveyer on rails 92, located beneath the tank (see Fig. 8). The transverse frames are connected to the links by means of arms 93 carrying a plate 94 which is bolted onto a side plate 95 projecting from the link. The bottom of each link is preferably channel-shaped in section, as can be seen by reference to Fig. 8 and the sides and the upper branch of the conveyer are supported by the engagement of these channel shaped links with the tracks 74.

The other form of conveyer referred to hereinbefore is illustrated in Figs. 17 and 18. This form is of somewhat simpler construction than the one hereinbefore described, particularly as to the transverse frame. Each transverse frame comprises generally a pair of side straps 97 connected at their ends by angle bars 98 and having bolted thereto castings 99, each casting carrying four bottle supports. Each bottle support comprises a plurality of vertical fingers 100 radially disposed about a central opening, each finger being preferably V-shaped in section. The upper ends of these fingers are beveled upwardly and outwardly from the central openings, as shown at 101. These fingers project upwardly from an annular base 102 and unite such annular base with a ring 103 forming a bottle mouth seat or support. Openings 104 are provided between the inner and outer rings 102 and 103, and between the bases of the fingers 100, these openings being disposed ninety degrees apart and grouped around a common central opening 105 provided within the ring or seat 103.

The bottle mouth support operates in precisely the same manner with reference to the openings of the jet nozzles as in the construction hereinbefore described.

The ends of the frame comprising the straps 97 and the cross bars 98 are connected to the side links 87 by means of flanges 106 projecting from the angle bars 98 and bolted to plates or flanges 95 projecting from the links. The links 87 are identical with those described in connection with the preceding form of conveyer.

Above each washing or nozzle box and coöperating with the nozzles in cleansing the outsides of the bottles are transversely arranged hoods 107, each hood being preferably a sheet-metal plate formed to present a series of transversely extending corrugations 108 having their downwardly directed apices 109 preferably above the center of a jet nozzle. These hoods cause the liquid striking thereagainst to be directed downwardly on the bottoms of the bottles and assists in removing the dirt and labels therefrom.

*Final brushing and rinsing apparatus.*

The tracks for the conveyer are extended rearwardly through the final brushing and cleaning apparatus at the rear or discharge end of the machine. This final brushing and rinsing apparatus will be described briefly, since practically all of the features thereof are set forth in the application of Gruetter referred to hereinbefore.

The mechanism comprises generally a vertically reciprocable box 110 having a flexible water supply connection 111 and provided with a plurality of hollow spindles 112 each having a brush 112ᵃ at its upper end which, when the box is in its lowermost position, will be retained within a guide tube or sleeve 113 having a frusto-conical end 114 adapted to coöperate with the upwardly projecting frusto-conical bottle mouth supports on the conveyer, the brushes being moved through the guides 113, frusto-conical extensions 114 and into the bottles when the latter are brought into alinement with the spindles. The brush spindles are provided with intermeshing gears 115 driven by a master gear 116 slidably keyed upon the vertical shaft 117. The final rinsing tubes 118 are mounted on the rear end of the box 110 and are adapted to discharge water into the bottles just prior to their delivery from the apparatus 119 denotes a trough through which the spindles 112 and tube 118 project, said trough collecting the water discharged from the bottles and in turn discharging this water into the waste pipe 120.

121 denotes a clamping frame mounted above the brushing and rinsing spindles and provided with a plurality of bottom clamps 122. This frame 121 is adapted to reciprocate to a slight extent and is provided with a cross head 123 which is sleeved upon guide rods 124. The frame 121 is suspended by links 121ᵃ (see Fig. 24) depending from the inner ends of the horizontal levers 125. The outer ends of these levers are provided with a plurality of apertures 125ᵃ by means of which they may be connected to the outwardly projecting arms 126 of angle levers the upwardly extending arms of which (126ᵃ) are connected by means of a spring 127 and rods 128. The levers 125—126ᵃ are rotatably supported on a shaft 129. This construction forms a yielding support for the frame 121. From the lever arms 126 depend the rods 130, one on each side of the frame work 131. These rods are conveniently guided by projections 132, 133, on each side of the frame 113ᵃ and the box 110, respectively, and each is provided with adjustable collars 134 and 135. By this construction, as the box 110 moves downwardly and is near the lower end of its stroke, the projections 133 engage the collars 135, pull downwardly upon the rods 130 to thereby rotate the levers 125—126ᵃ and thus move the bottle clamp frame 121 away from the bottles and permit the advance of the bottle conveyer therebeneath; and a slightly further movement in the same direction causes the collars 134 to engage the projections 132 on the frame 113ᵃ and move the same downwardly against the action of the springs 136, which yieldingly support said frame. This con-joint operation of the frames 113ᵃ and 121 enables the bottle conveyer with the bottles thereon to be advanced the next step toward the rear or discharge end of the apparatus.

The shaft 117 which carries the master gear 116 for driving the brush spindle gears 115 is provided at its lower end with a beveled gear 117ᵃ within a housing 137 which contains bevel gear 138 meshing with the gear 117ᵃ and mounted on a shaft 139.

The box 110 is reciprocated by a rock shaft 140 having a pair of arms 141 thereon, said arms being each connected at one end to the box by means of a link 142 (see Figs. 3 and 5) and each having a counterbalancing weight 143 at its opposite end. The shaft 140 is rocked by an arm 144 connected to the shaft and having a slot near its outer end in which there is slidably mounted a block 145 to which one end of a connecting rod or pitman 146 is connected, the opposite end of the pitman being connected to a crank 147 mounted on the shaft 148, the crank being provided with a counterbalancing extension 149.

150 denotes a pipe, including the flexible section 111 (see Fig. 7), for supplying water to the spindle box 110. The pipe 150 is provided with a valve 151 adapted to control the supply of water to the box and said valve is operated by means of a lever 152 connected thereto at one end and having its opposite end connected to a link 153 which is itself connected to the rock arm 144, as shown at 154. It will be evident that the movement of the shaft 140 to raise and lower the box 110 will also open and close the valve 151 to supply water to the box when needed and to cut off such supply when the box is lowered.

*Bottle conveyer feeding mechanism.*

The bottle conveyer, as previously stated, comprises a pair of side chains, each having ratchet teeth 88. These ratchet teeth are intended to be engaged by pawls, and these pawls are mounted on rods 155 slidably mounted within the upper portion of the tank. The rods may be hollow or tubular, for purposes of lightness, and are each provided with a plurality of pawl carriers 156, which may be conveniently bolted thereto. The pawls 157 are pivotally mounted between the downwardly projecting lower ends of the carriers 156 and are adapted to abut against the ratchet teeth or shoulders 88 on the conveyer chain. For the purpose of supporting and guiding the rods 155 in their movements, the upper portion or cover for the tank is provided on each side with a plurality of brackets, each bracket comprising a frame 158 which may be bolted or otherwise secured to the side of the tank cover. These frames project inwardly and support each a pair of vertically spaced rollers 159, 160, in rolling engagement with which the pawl carrying rods 155 may be reciprocated. It will be observed that this arrangement contemplates no vertical reciprocation of the rods 155. Such reciprocation however is rendered unnecessary by the drive for the rods, which drive is secured by means of a transverse rock shaft 161 extending across the tank and having a pair of vertically extending rock arms 162 connected thereto, the upper end of each rock arm being connected to a pawl carrier rod 155 by means of a link 163 pivotally connected to said rod. This link, as shown, is preferably composed of adjustably connected sections, whereby its effective length may be varied.

*Driving mechanism.*

Parts of the driving mechanism have necessarily been referred to hereinbefore in connection with the various parts of the apparatus. 164 denotes a motor which drives two of the pumps 26 which supply the front compartments A and B, and 165 denotes a motor driving a shaft 166 for the pumps supplying water to the compartments C and D. This shaft is extended to a point between the rear of the tank proper and the front of the final brushing and rinsing apparatus which has just been described. At its rear end the shaft is provided with a sprocket on which is mounted a "noiseless chain" 167, the chain passing over a sprocket 168 on the shaft 139 located at the central portion of the apparatus. This shaft is provided at the end opposite the gear 138 with a pulley 169 over which passes a belt 170, said belt passing over a pulley 170$^a$ (Fig. 23) connected to and thereby driving a shaft 171 on the opposite side of the apparatus from the shaft 166. This shaft is provided with a worm 172 within a casing 173$^a$ (see Figs. 3 and 9) which worm meshes with a worm gear 173 on the transverse shaft 148.

Projecting from the shaft 148 is a crank arm 175, the outer end of which is connected with a slide 176 mounted within an arm 177 which is pivoted at one end (as shown at 178) at a point remote from the shaft 148. The central portion of the arm 177 is connected by means of a link 179 with an arm 180 rigid with the rock shaft 161 which operates the pawl-carrying rods 155. An adjustable connection is provided between the link 179 and arm 180 by a pin-and-slot connection. The purpose of rocking the shaft 161 by the mechanism described is to impart a slow recovery stroke and a quick feeding movement to the pawl carriers, the parts being practically at rest during the greater part of the vertical movement of the end of the crank arm 175. This construction provides a simple and efficient means for feeding the bottle conveyer along the rails by an intermittent movement while enabling the bottles to remain in a stationary position a sufficient length of time to insure the filling of the bottles with liquid and the efficient rinsing of the outside of the bottles by such liquid.

The shaft 171 extends to the front of the apparatus, where it is provided with a worm 181 within a casing 182 (see Fig. 11). The worm meshes with a worm gear 183 on the shaft 67, said shaft carrying a sprocket wheel 66 by which and the chain 64 and the sprocket 65, the label conveyer is driven. Adjacent to the pulley 170$^a$ the shaft 171 is provided with a pulley 184. Near the rear end of the cover there is mounted a shaft 185 having a pulley 186 thereon and around these last two pulleys extends a belt 187. A shaft 188 is driven from the shaft 185 by means of sprockets 189 and 190 and the chain 191. The shaft 188 drives a brush 192 which is mounted at the rear end of the tank cover and is adapted to operate upon the bottoms of the bottles as they are carried beneath the brush by the conveyer.

The shaft 188 is mounted in curved slots 188ª, the shaft being carried by arms 185ª pivoted on the shaft 185, whereby the brush 192 may be adjusted for different lengths of bottles.

The bottle conveyer passes over guiding and supporting wheels 193 and 194 located respectively at each side of the front and back of the apparatus, the first-mentioned wheels being preferably carried by a shaft 195 supported in journal boxes 196 adjustably mounted in guide ways 197 projecting forwardly from the apparatus. By means of the adjusting screws 198, the tension of the conveyer may be adjusted from time to time. It will be noted that the rails 74 and 92 are extended at the front and rear of the machine in such manner as to guide the conveyer conveniently to the wheels 193, 194.

Each compartment A, B, C, and D is provided with a door 199 having one or more transparent panes 200 to permit inspection of the interior of the tank. Each door is provided with upwardly extending lugs 201 by means of which it may be pivotally connected to lugs projecting from the side of the cover. Each pane rests upon a ledge 202 provided in the door frame proper, said ledge having a recess for the reception of a gasket 203 against which the pane can bear. The pane is clamped in place by means of a frame 204 having one or more openings for the pane, the clamping frame being secured to the body of the door by means of screws 205, there being a gasket 206 interposed between the clamping frame and the perforated portion of the pane therebeneath. The doors are conveniently retained closed by means of buttons 207. In addition to the doors 35 and 199, the tank is provided with a plurality of man-holes having removable covers 208.

The driving connection between the shaft 171 and the conveyer mechanism operated thereby is obtained by means of a clutch 209 (see Fig. 3) and this clutch is thrown by a yoke 209ª connected to a rod 210 extending the full length of the apparatus and having an operating handle 211 at each end thereof, whereby the mechanism may be put into and out of operation from either end of the apparatus.

With the apparatus constructed as described, it is believed that the operation will be clear. The motors 164 and 165 having been started in operation and the shafts driven thereby having been set into rotation, water will be taken from the compartments A, B, C, and D and forced by the pumps 26 into the washing boxes 37 and through the nozzles 40 and into and around the bottles thereabove. The conveyer will be fed through the tank structure, above the compartments and washing boxes by an intermittent movement, imparted by the reciprocation of the pawl carriers 155. The bottles on the conveyer, after having been rinsed by the cold liquid from the compartment D are passed beneath the brush 192 and thence to the final brushing and rinsing apparatus, 70 where the interiors are thoroughly brushed in the presence of a supply of cleansing liquid through the spindles 112 and are finally rinsed by the liquid flowing through the jets 118. As the conveyer passes from this final cleaning apparatus toward the wheels 194, the operator removes the clean bottles therefrom.

The labels loosened by the action of the liquid on the outside of the bottles are deposited upon the label conveyer 51 and carried by said conveyer to the front of the apparatus where, through the downward and rearward inclination of the conveyer between the sprocket wheels 61 and 68 and the action of the cleaning pipe 70ª, they are dislodged and dropped upon the screen 72, which can be conveniently withdrawn from its support from time to time to enable the labels to be disposed of as occasion may require.

The liquid falling from above upon the conveyer is filtered by the conveyer screens, and by the screened trays 49, therebeneath, so that the liquid, when it returns to its particular compartment, is quite effectively cleansed from foreign material. Should, however, any such matter remain in the liquid, the strainers 31 will serve to prevent the same from entering the pumps and clogging the same. When it is desired to remove and clean these strainers, this operation can be conveniently effected by opening the doors 35, unclamping the bales 32 from the strainer covers, and withdrawing the strainer tubes bodily through the upwardly and outwardly extending projections of the tank side.

Any liquid that may be needed to replenish the compartments from time to time may be admitted through the pipe 11 and warming fluid may be circulated through the compartments and the temperature of the liquid in such compartments raised to the appropriate degree by the thermostat opening the heating-fluid valve and permitting such fluid to flow through the injector nozzle 14. Should it be desired to drain the compartments, this draining can be effected by opening the valves f communicating with the lateral pipes projecting from the bottoms thereof. It will be noted that between the compartments C and D there is a space or compartment E which contains no liquid, but which serves as a draining station between these compartments as well as a space for the accommodation of the shaft 161. This compartment also will receive more or less liquid from the bottles and from the bottle and label conveyers and it also is provided with a lateral drain pipe $e$ communicating with the pipe $9^a$ and having a valve $f$ therein.

By the apparatus disclosed herein, the bottles are thoroughly and effectively sterilized and cleaned, within and without, and the labels and other foreign material on the outside removed. It is possible to use repeatedly the cleansing and sterilizing solution in each compartment; to keep the labels and other foreign material out of the solution in each compartment; and to remove the labels and other sediment, not only by the label conveyer but by the withdrawal of the trays 49; to make the feeding of the bottles through the apparatus automatic; to provide a combined conveyer and bottle support which is extremely efficient; also a particularly effective construction of nozzles. Still further, and more generally, the construction illustrated and described herein provides an apparatus which is of very great capacity and which nevertheless accomplishes the cleansing of the bottles in an extremely efficient manner.

Having thus described our invention, what we claim is:

1. In an apparatus of the character set forth, the combination of a track, an endless bottle conveyer having a pair of side chains mounted on the track, said chains having ratchet teeth, means for supplying liquid to bottles on said conveyer, a pair of pawl carriers reciprocably mounted above the conveyer and extending along opposite sides thereof, pawls carried thereby adapted to engage the ratchet teeth on the chains by gravity and to slide along said chains, and means for reciprocating said pawl carriers.

2. A bottle conveyer for apparatus of the character set forth comprising a supporting frame for bottles and similar articles having a plurality of mouth supports, each support being frusto-conical in shape and having a central opening for the admission of liquid into the interior of the article and a plurality of openings surrounding the central opening and adapted to permit liquid to be discharged upon the outside of the article.

3. A conveyer having a plurality of bottle mouth seats, each seat having a central opening for supplying liquid to the interior of a bottle thereabove, and means connecting each seat to the conveyer, such connecting means being provided with openings grouped about the first mentioned opening.

4. The combination, with a bottle mouth support having an opening adapted to aline with the interior of the bottle and other openings through which liquid may pass to the exterior of the bottles, of a nozzle having discharge openings adapted to aline with the openings in said support, and means for forcing fluid through the nozzle openings.

5. The combination, with a washing device having a group of discharge apertures, said group comprising a central aperture and apertures surrounding the central aperture, two of the surrounding apertures being in diametrical alinement with the central aperture, of a supporting device having a seat adapted to engage the mouth of a bottle or similar article, said seat having a central opening for supplying liquid to the interior of the article and having openings surrounding the central opening and adapted to register with the apertures in the spraying device, means for supplying fluid through said apertures, and means whereby the supporting device may be moved across the spraying device in the direction of the diametrically alined apertures.

6. The combination, with a washing box having a plurality of nozzles provided each with a central opening and with openings surrounding the central opening, two of the surrounding openings being in diametrical alinement with the central opening, of a bottle supporting device having seats adapted to support bottles in an inverted position, each seat having a bottle mouth support provided with a central opening for supplying liquid to the interior of the bottle and having openings surrounding the central opening and adapted to register with the openings in the nozzles therebeneath means for supplying liquid under pressure through said nozzles, and means whereby the bottle support may be moved across the spraying box in the direction of the diametrically alined openings.

7. The combination, with a washing box having a plurality of nozzles each having a central opening and openings surrounding the same, two of the latter openings and the central opening being diametrically alined, of a bottle supporting device, means for moving the same across the spraying box in the direction of the diametrically alined openings, the bottle support being provided with a plurality of seats complementary to the nozzles, each seat having a central opening adapted to register with the interior of a bottle and having openings surrounding the central opening, the openings in the seat being arranged to register with the openings in a nozzle therebeneath and there being fingers between the exterior openings of each seat adapted to receive therebetween a bottle neck.

8. The combination, with a washing device, of a mouth support having a central opening adapted to register with the interior of a bottle or similar article and having openings surrounding the central opening, there being upwardly projecting fingers between the exterior openings of each mouth support adapted to receive therebetween the neck of the bottle or similar articles, the upper ends of the fingers being beveled upwardly and outwardly.

9. In an apparatus of the character set forth, the combination of a tank, bottle supporting means in operative relation to said tank, means for supplying liquid to the bottles on such support, a perforated label conveyer beneath the bottle support, a screen covering the perforations of the conveyer, and means for driving said conveyer to discharge the labels outside of the tank.

10. In an apparatus of the character set forth, the combination of a tank having a plurality of compartments therein, a track extending through said tank and through the compartments thereof, an endless label conveyer extending through the tank beneath the track, a washing box for each of the compartments located between the track and the conveyer, means for forcing liquid from each compartment to its washing box, means for discharging upon the conveyer all of the liquid supplied from the washing boxes, and a screen in each compartment located below the conveyer and removable through the side wall of the tank.

11. In an apparatus of the character set forth, the combination of a tank, a track extending through said tank, an endless label conveyer extending through the tank beneath the track, a washing box located between the track and conveyer, means for forcing liquid to the washing box, means for discharging upon the conveyer all of the liquid supplied from the washing box, and a screen located below the conveyer and removable through the side wall of the tank.

12. In an apparatus of the character set forth, the combination of a tank having a plurality of compartments therein, a track within the tank above the compartments thereof, bottle supporting means movable along said track, a washing box for each of the compartments located below the track, means for supplying liquid to each of said boxes, an endless conveyer in said tank arranged to receive the liquid draining from the bottles and the upper portion of the tank, a door in the side of the tank for each compartment, and a screen in each compartment slidably supported below the label conveyer and removable through the door.

13. In an apparatus of the character set forth, the combination of a tank having a liquid compartment therein, a washing device in said compartment above the liquid therein, a supporting device above the washing device, a pump having an inlet connection in the compartment and adapted to supply liquid therefrom to the washing device, an upwardly inclined perforated strainer pipe within the compartment, and means detachably connecting the strainer pipe to the pump inlet connection, said tank having an upwardly inclined extension adjacent to the upper end of the strainer, and a door for such extension.

14. In an apparatus of the character set forth, the combination of a tank having a liquid compartment therein, a washing device above the liquid in said compartment, a bottle support above the washing device, a pump having an inlet connection in the compartment adapted to force liquid from the compartment into the washing device, the tank being provided with an upwardly inclined extension on the side opposite the pump inlet connection, a cover for the upper end of such extension, a strainer pipe having its upper end adjacent to the inclined extension, and means adjacent to the inclined extension for detachably connecting the strainer pipe with the pump inlet connection.

15. In an apparatus of the character set forth, the combination of a tank having a liquid compartment, a washing device above said compartment, a pump having an inlet connection communicating with the compartment and adapted to force liquid from the compartment into the washing device, a bottle support above the washing device, the tank being provided with an opening in the side wall opposite the pump inlet connection, a cover for said opening, a screen slidably supported beneath the washing device and removable through said opening, and a strainer pipe detachably connected to the pump inlet connection and also removable through said opening.

16. In an apparatus of the character set forth, the combination of a tank having a compartment, a washing device above said compartment, a pump having an inlet connection communicating with the compartment and adapted to force liquid from the compartment into the washing device, a bottle support above the washing device, the tank being provided with an opening in the side wall, a cover for said opening, and a screen slidably supported beneath the washing device and removable through said opening.

17. In an apparatus of the character set forth, the combination of a tank, a track in said tank, supporting means movable along said track, means for supplying liquid to the articles on the support, ratchet projections carried by the supporting means, brackets carried by the tank and having vertically spaced rollers, pawl carriers reciprocably supported between the rollers of said brackets, pawls supported by said carriers and adapted to engage said ratchet projections, and means for reciprocating said carriers.

18. In an apparatus of the character set forth, the combination of a tank, a track in the tank, supporting means mounted on the track and having ratchet teeth, means for supplying liquid to the articles on the support, a pair of longitudinally movable pawl carriers in said tank, pawls depending from said carriers and adapted to engage said teeth by gravity, and means for reciprocating said carriers, said means comprising a rock shaft, arms projecting from said shaft, and a link connecting each arm with a pawl carrier.

19. In an apparatus of the character set forth, the combination of a track, supporting means mounted on the track and having upwardly projecting ratchet teeth, means for supplying liquid to the articles on the support, a longitudinally movable pawl carrier, and located above said supporting means, pawls carried by said carrier and adapted to engage said ratchet teeth, and means for reciprocating said carrier, said means comprising a rock shaft, an arm projecting from said shaft, and a link connecting said arm with the pawl carrier.

20. A washing box for apparatus of the character set forth comprising a hollow receptacle having a plurality of jet orifices on one surface thereof and provided with an inlet connection, the inlet connection communicating with the bottom at the central point of one of the side walls and said bottom being inclined upwardly on opposite sides of the inlet connection and being inclined upwardly in a direction away from the inlet connection.

21. The combination, with a tank having opposed side walls, one of said walls having an opening therein, of a washing box having a flange adapted to engage the side wall of the tank surrounding the opening, and a supply connection extending through the opposite wall of the tank and detachably connected to said box.

22. The combination, with a tank having opposed side walls, one of said walls having an opening therein, of a washing box having a flange adapted to engage the side wall of the tank surrounding the opening and having projections adapted to engage the opposite wall, and a supply connection extending through the last mentioned wall of the tank and detachably connected to said box.

23. The combination, with a tank having opposed side walls and provided with an opening in one of said walls, of a washing box having a flange adapted to engage the portion of the side wall surrounding the opening and having at its opposite end an inlet connection, a pipe extending through such opposite side wall of the tank and detachably secured to said connection, said box being provided in its flanged wall with one or more clean-out openings, and doors closing said openings.

24. In an apparatus of the character set forth, the combination of a box, means for supplying liquid thereto, a plurality of hollow spindles carried by the box, a bottle carrying device movably supported above the box, a frame above said device having a plurality of bottle bottom clamps, a pair of opposed angle levers each having a vertically extending arm and an outwardly extending arm, a spring connecting the vertically extending arms, a shaft on which said levers are pivoted, a second lever pivotally supported intermediate of its ends on each shaft, links suspending the frame from the inwardly extending arms of the last-mentioned levers, an adjustable connection between the outwardly extending arms of the first-mentioned and second-mentioned levers, means for reciprocating the box toward and from the bottle carrying device, and connections operative by the movement of the box away from the bottle carrying device for rocking one of said levers and thus moving the frame away from the bottle carrying device.

25. In an apparatus of the character set forth, the combination of a box, means for supplying liquid thereto, a plurality of hollow spindles carried by the box, a bottle carrying device movably supported above the box, a frame above the device having a plurality of bottle-bottom clamps, means including a spring for yieldingly supporting said frame, means for moving the box toward and from the bottle carrying device, means operative by the movement of the box away from the device for moving the frame away from the bottle carrying device, connections whereby the movement of the box away from the said device will move the frame away from said device, and means for adjusting the tension of said spring.

26. The combination, with a bottle support comprising a frusto conical bottle mouth seat having an opening in the apex thereof and openings in the inclined surface grouped about the first-mentioned opening, of means whereby a bottle may be supported on said seat with its mouth registering with the first-mentioned opening, and means for supplying liquid through said openings to the interior and exterior of a bottle.

27. In an apparatus of the character set forth, the combination of a tank having a plurality of compartments therein, a track extending through said tank and through the compartments thereof, means for conveying bottles along said track, means for supplying liquid to the outside of the bottles so conveyed, and a screen below the track in each compartment, the screens being inclined downwardly from one side of the compartment to the other and removable through the side of the tank.

28. In an apparatus of the character set forth, the combination of a tank having a plurality of compartments therein, a track extending through said tank and through the compartments thereof, means for conveying bottles along said track, means for supplying liquid to the outside of the bottles so conveyed, a screen below the track in each compartment, the screen being inclined downwardly from one side of the compartment to the other, and doors permitting the removal of said screens.

29. In an apparatus of the character set forth, the combination of a liquid containing tank, means for supporting bottles or similar articles above the liquid in said tank, means for forcing the liquid in the tank into the bottles so supported, a screen interposed between the bottle support and the liquid in the tank, the screen being inclined downwardly from one side of the tank to the other, and means whereby the screen may be removed through the side of the tank.

30. The combination, with a bottle mouth support comprising a frusto-conical seat having a central opening for the admission of liquid into the interior of a bottle and a plurality of openings in the tapered or inclined surface of the seat and surrounding the central opening, of means projecting from the seat for engaging the outer surface of the bottle to support the same, and means whereby liquid may be forced through said openings.

31. The combination, with a washing box having a plurality of groups of openings, each group comprising a central opening and a plurality of openings surrounding said central opening, the central opening being arranged to discharge a jet of liquid into the interior of a bottle inverted thereabove and the other openings being adapted to discharge jets of water in contact with the outside of said bottle, of means for moving a bottle successively above the central opening of each group of openings.

32. The combination, with a washing box having a plurality of nozzles, each nozzle being provided with a central aperture through which water may be supplied to the interior of a bottle and a plurality of apertures grouped about the central aperture and arranged to discharge water against the outside of such bottle, of means for supplying liquid under pressure to said box, and means for moving the bottle successively into register with the central opening of each nozzle.

33. The combination, with a tank having opposed side walls and provided with openings in said walls, of a washing box interposed between said openings, a supply pipe extending through one of said openings and connected to the adjacent portion of the box, the opposite portion of the box projecting through the adjacent opening in the tank wall and itself having an opening, and a closure for the last mentioned opening.

34. A bottle conveyer for apparatus of the character set forth comprising a plurality of transversely extending frames, each having one or more seats for the mouth of a bottle and each seat having a perforation for the mouth of a bottle, and fingers grouped around such perforation and adapted to engage the bottle neck, the seat being perforated between said fingers for permitting a supply of liquid therethrough to the sides of a bottle on the seat.

35. A bottle supporting device comprising a frame having one or more bottle mouth supports thereon, each support having a seat for the mouth of a bottle with a perforation in said seat permitting the supply of liquid to the interior of a bottle on said seat and each seat having a plurality of spaced fingers surrounding the perforations and arranged to engage the neck of the bottle on the seat, there being perforations between said fingers permitting the flow of the liquid to the sides of the bottle on the seat.

In testimony whereof, we hereunto affix our signatures in the presence of two witnesses.

CHARLES H. LOEW.
JOHN R. GRUETTER.

Witnesses:
HUGH B. McGILL,
BRENNAN B. WEST.